US008762843B2

(12) United States Patent
Morse et al.

(10) Patent No.: US 8,762,843 B2
(45) Date of Patent: Jun. 24, 2014

(54) SYSTEM AND METHOD FOR MODIFYING MEDIA CONTENT PLAYBACK BASED ON LIMITED INPUT

(75) Inventors: Lee Morse, Sunnyvale, CA (US); Steven Mark Mosher, Sunnyvale, CA (US)

(73) Assignee: Creative Technology Ltd, Singapore (SG)

( * ) Notice: Subject to any disclaimer, the term of this patent is extended or adjusted under 35 U.S.C. 154(b) by 204 days.

(21) Appl. No.: 11/614,014

(22) Filed: Dec. 20, 2006

(65) Prior Publication Data

US 2007/0291404 A1    Dec. 20, 2007

Related U.S. Application Data

(60) Provisional application No. 60/805,001, filed on Jun. 16, 2006.

(51) Int. Cl.
*G11B 21/04* (2006.01)

(52) U.S. Cl.
USPC ............ 715/716; 715/728; 715/854; 381/110

(58) Field of Classification Search
USPC ........................... 715/854, 728, 716; 381/110
See application file for complete search history.

(56) References Cited

U.S. PATENT DOCUMENTS

| 2003/0221541 | A1* | 12/2003 | Platt .............................. 84/609 |
| 2006/0195790 | A1* | 8/2006 | Beaupre et al. ............... 715/727 |
| 2006/0259464 | A1* | 11/2006 | Szczublewski et al. ......... 707/3 |
| 2007/0088727 | A1* | 4/2007 | Kindig .......................... 707/101 |
| 2007/0162582 | A1* | 7/2007 | Belali et al. ................... 709/223 |

OTHER PUBLICATIONS

MusicMatch, Feb. 8, 2005, MusicMatch Jukebox, http://musicmatch-jukebox.com/.*

* cited by examiner

*Primary Examiner* — Andrea Leggett
(74) *Attorney, Agent, or Firm* — Russell Swerdon; Desmund Gean (57) ABSTRACT

A method for navigating among tracks uses limited input commands. A plurality of tracks is associated with a currently playing queue. One of the tracks in the queue is identified for a current focus. A voice command is received that includes a directional aspect and a metadata filtering aspect. In response, the focus moves to a second track having a different value for the selected metadata filtering category.

19 Claims, 5 Drawing Sheets

Fig._6B

SYSTEM AND METHOD FOR MODIFYING MEDIA CONTENT PLAYBACK BASED ON LIMITED INPUT

RELATED APPLICATIONS

This application claims the benefit of U.S. Provisional Application No. 60/805,001, entitled System and Method for Modifying Media Content Playback Based on Limited Input, and filed on Jun. 16, 2006, the specification of which is incorporated herein by reference in its entirety.

BACKGROUND OF THE INVENTION

1. Field of the Invention

The present invention relates to digital media products. More particularly, the present invention relates to interfaces for accessing digital media content.

2. Description of the Related Art

Digital content has evolved dramatically in terms of scope and prevalence over the past several years. For example, analog sources such as vinyl records played back on turntable playback units have been substantially replaced by portable CD ROM players or personal portable players having MP3 (Motion Picture Experts Group, Audio Layer III) and other audio digital file playback capabilities. Recently, personal portable players have added video track playback capabilities. Portable media players typically download digital media files from a client computer.

With cheaper and higher capacity flash and hard drive memories available, it isn't unusual to see a large number of audio or other media tracks stored on the portable device. For example, a portable media player having 1.0 GB of flash memory is capable of storing and playing more than 300 audio tracks compressed at a typical compression level. A 30 GB hard drive based portable media player is capable of storing and playing more than 10,000 tracks compressed at a typical compression level. Hence, portable media players typically storing hundreds and in some cases thousands of tracks need a way to efficiently identify tracks for playback. In order to access these tracks, navigation methods have been disclosed that use hierarchical navigation techniques. In order to access a particular track, for example to play it or to add it to a playback queue, an interactive procedure takes place wherein the user provides a selection through an input control in response to a presentation of all or part of the hierarchy as displayed on a display screen. Unfortunately, under some conditions, the user may not be able to devote full attention to the navigational hierarchy views displayed on the display screen or prefer an alternative arrangement.

It is therefore desirable to provide a navigation method that allows the user to locate suitable tracks without requiring his full attention to the navigation views presented on a display screen.

SUMMARY OF THE INVENTION

The present invention provides a reduced complexity navigation method. A traditional navigation user interface is replaced or augmented with a simpler set of commands that allow navigation without requiring a generated view of a navigation tree.

In a preferred embodiment, voice commands are used to control personal digital electronics (PDE) devices such as portable media players. In an alternative embodiment, the navigation techniques are applied to any consumer electronics devices involving navigation commands.

Various embodiments of the present invention provide a "rich" set of content navigation methods, without the complexities of a full user interface. The portable media device is configured to respond to a simple set of navigation 'commands' (e.g., next, previous, repeat, shuffle) preferably coupled with one level of qualifiers (e.g., artist, album, track, genre) to create a more directed selection of content to be rendered.

In accordance with a first embodiment, the user input includes voice commands with the portable electronic device configured to respond to a selected set of commands. In alternative embodiments, other controls are provided to accept user input. Non limiting examples include switches, touch screens, pointing devices, gestures, etc. suitable for communicating a user's input to the hardware and software of the portable or other electronic device.

In yet another embodiment, the device is configured such that a voice or audio responsive state is initiated upon the depressing of a switch or other activation device. This 'Push to Listen' mode differs from conventional voice based designs that require a 'Push to Talk' button stay in a depressed state while talking in order for the unit to process the voice. Instead, in embodiments of the present invention, the 'Push to Listen' button is pressed and released. This initiates or wakes up the device and causes it to listen for a key command word as an indication that the user is issuing voice commands. Preferably, the unit stays in this state for a fixed time period. For example, in one embodiment, the fixed time period lies in the range from 10-30 seconds before it returns to a sleep mode.

In the voice responsive state, i.e., the listening mode, the unit responds to any commands issued by the user. When the unit returns to a sleep mode, it preferably generates a short voice message to indicate that it is entering the sleep mode.

Provided is a method for navigating through a currently playing queue of tracks by a simple user input. The method selects a next track for access or playback by using a filtering process. That is, the next track selected for playback is generated based on a qualifier or filtering element. This can be interpreted as identifying a currently selected field and proceeding to search the ordered listing of tracks to find a new track or record having a different value in that field. For example, when the qualifier uses or is based on the "album" field, user input such as a next command will cause the playback or rendering to proceed to the next "album", i.e., the musical track in the ordered listing wherein the "album" metadata filed has a different value from the currently playing track's "album" field.

In a preferred embodiment, the navigation operation part of the command is one of "next" or "previous" and the "qualifier" field is one of genre, artist, or album. In accordance with another embodiment, the navigation operation and qualifier (base) field commands are provided by the user's voice and the device is recognized by the device's voice recognition unit. More preferably, the voice recognition module is configured to respond to a limited number of voice commands. This has the advantage of limiting the processing power required for the portable device. In order to provide a reliable recognition of commands while limiting the processing resources devoted to the voice recognition technology, restricting the command vocabulary to a handful of words serves these dual purposes. By using a limited vocabulary or other commands (e.g., a limited number of button commands) an improved navigation experience is provided to the user.

In a more preferred embodiment, the portable device includes voice recognition technology integrated with other user input controls such as buttons. In this way, the portable device is fully functional even in noisy environments where the "enhanced" navigation from the "voice recognition technology is unavailable. The supplementary user input control buttons provided are a matter of design choice. Without intending to be limiting, one embodiment includes power, play/pause, and volume buttons.

In yet another embodiment, a method is provided for navigating from a first track to a second track in an ordered listing of tracks having at least one metadata category associated with each of the tracks. Initially, a command signal is generated that identifies a navigation operation and a metadata qualifier. A second track is selected from the ordered listing as based on 1) a comparison of a first value for a metadata category derived from the metadata qualifier with the second track's value for the metadata category and 2) the navigation operation identified in the command signal. In one variation, the navigation operation is one of shuffle and repeat, the first value for the metadata category is a specific genre type identified in the command signal's metadata qualifier and the comparison comprises matching the specific genre type with the second track's value for the metadata category.

In another variation, the first value for the metadata category is determined by examining the first track's metadata category corresponding to the metadata qualifier. The comparison includes a determination that the second track's value for the metadata category does not match the first value. The navigation operation is preferably one of next, previous, and shuffle, and more preferably next or previous.

In yet another embodiment still, a method of navigating to a track comprises associating a plurality of tracks with a queue accessible for immediate playback of the tracks. A first track in the queue is identified as a starting point. Navigation to a second track in the queue occurs in response to a voice command that includes a navigation operation aspect and a metadata qualifier aspect. The second track is selected as based on the navigation operation aspect of the command and an evaluation of the metadata qualifier aspect. The evaluation comprises determining a metadata category corresponding to the metadata qualifier aspect and a comparison of the first track's value for the metadata category with the second track's value for the metadata category. While the tracks can be any type of tracks such as video tracks, audio tracks are identified in a preferred embodiment. In one mode of this embodiment, the navigation operation comprises one of next and previous, wherein next refers to any next track in the ordered arrangement of tracks, previous refers to any previous track or previously accessed group in the ordered arrangement of tracks. The comparison includes a determination that the first value does not match the second value. In one variation, the voice command further includes a greeting command advising of an impending navigation operation aspect or metadata qualifier aspect of the command signal.

These and other features and advantages of the present invention are described below with reference to the drawings.

DETAILED DESCRIPTION OF PREFERRED EMBODIMENTS

Reference will now be made in detail to preferred embodiments of the invention. Examples of the preferred embodiments are illustrated in the accompanying drawings. While the invention will be described in conjunction with these preferred embodiments, it will be understood that it is not intended to limit the invention to such preferred embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known mechanisms have not been described in detail in order not to unnecessarily obscure the present invention.

It should be noted herein that throughout the various drawings like numerals refer to like parts. The various drawings illustrated and described herein are used to illustrate various features of the invention. To the extent that a particular feature is illustrated in one drawing and not another, except where otherwise indicated or where the structure inherently prohibits its incorporation of the feature, it is to be understood that those features may be adapted to be included in the embodiments represented in the other figures, as if they were fully illustrated in those figures. Unless otherwise indicated, the drawings are not necessarily to scale. Any dimensions provided on the drawings are not intended to be limiting as to the scope of the invention but merely illustrative. Further to the extent that details as to methods for forming a product or performing a function are illustrated in the drawings, it is understood that those details may be adapted to any apparatus shown in the drawings suitable for performing that function or suitable for configuration using the results of the method as though those same method details were fully illustrated in the drawing containing the apparatus.

Various embodiments of the present invention provide a "rich" set of content navigation methods, without the complexities of a full user interface. In one embodiment, the portable media device is configured to respond to a simple set of navigation 'commands' (e.g., next, previous, repeat, shuffle) preferably coupled with one level of qualifiers (e.g., artist, album, track, genre) to create a more directed selection of content to be rendered.

User interfaces permit control functions and/or feedback between a user and the logic inherent in a device, such as a portable media player. Moreover, user interfaces provide a convenient means of access to data sequences such as media tracks stored in portable media players. The user interface typically involves the transmission of a command to the device and often also includes a means for conveying to the user feedback, an assessment of the state of the device, or in general some insight into the memory structure or logical arrangement of data in memory modules associated with the device. In many cases, data will be stored internally in memory of the device. For example audio tracks are often stored in compressed form in portable audio player devices. Text documents are stored in computer files. Videos are often stored in digital compressed form for decoding and playback.

The memory types available in portable media players for storage of the tracks or other data sequences are extensive and include as non limiting examples flash memory, removable media such as optical disks, and hard disk drives. In most cases, the memory is stored at available locations in the memory banks (of flash chips), or on the hard disk. In fact, a single audio track may be scattered across the banks of flash memory or in various disparate sectors on a hard disk drive. This physical arrangement is in most cases independent from a logical arrangement that is made visible to the user. In other words, the physical scattering of a track in different memory locations is usually invisible to the user. Instead, the user is typically presented with a more familiar logical arrangement of tracks, for example, an ordered listing of tracks based on the track titles.

A convenient means of accessing those tracks is important. One convenient means of accessing tracks involves navigating through a plurality of tracks using a hierarchy. For example, the Zen Micro portable media player manufactured and distributed by Creative Technology LTD of Singapore includes in its user interface a display screen and user input controls. Navigation through the hierarchy involves a user selection of a category and in response, a presentation of a number of items within that category is made on the display screen. Typically the user makes another selection, for example by highlighting one of the items and allowing the screen to convert to an expansion of the selected item, i.e., a presentation of a listing or plurality of items corresponding to the selection. While these technique work well in many or most cases, there are certain instances where additional or alternative user interaction alternatives are desirable.

The user interface described in various embodiments of the present invention provides the user control over access to the tracks. Preferably, the individual tracks are associated with one or more metadata fields for the track. For example, a track title is one metadata field. Additional metadata fields can include (but are not limited to) genre for the track, artist name, album title, composer, and date of recording. Virtually any data about the track data can be stored and accessed by the user. This information can be stored in fields associated with digital audio tracks, for example in memory locations correlated to the music content stored in the tracks. In particular, much metadata information for a track is available from Compact Disk Data Bases (CDDB databases) and in some cases the metadata information is stored in headers of compressed MP3 files.

The present invention provides a method for navigating through a group of tracks, for example a currently playing queue or a playlist, by a simple user input. The method manages access to tracks in response to limited control inputs. In one embodiment, the control inputs include a grouping of a navigation command in conjunction with a qualifier command. For example, the simple set of navigation direction commands preferably include one from the group of next, previous, repeat, and shuffle.

Figure 1:
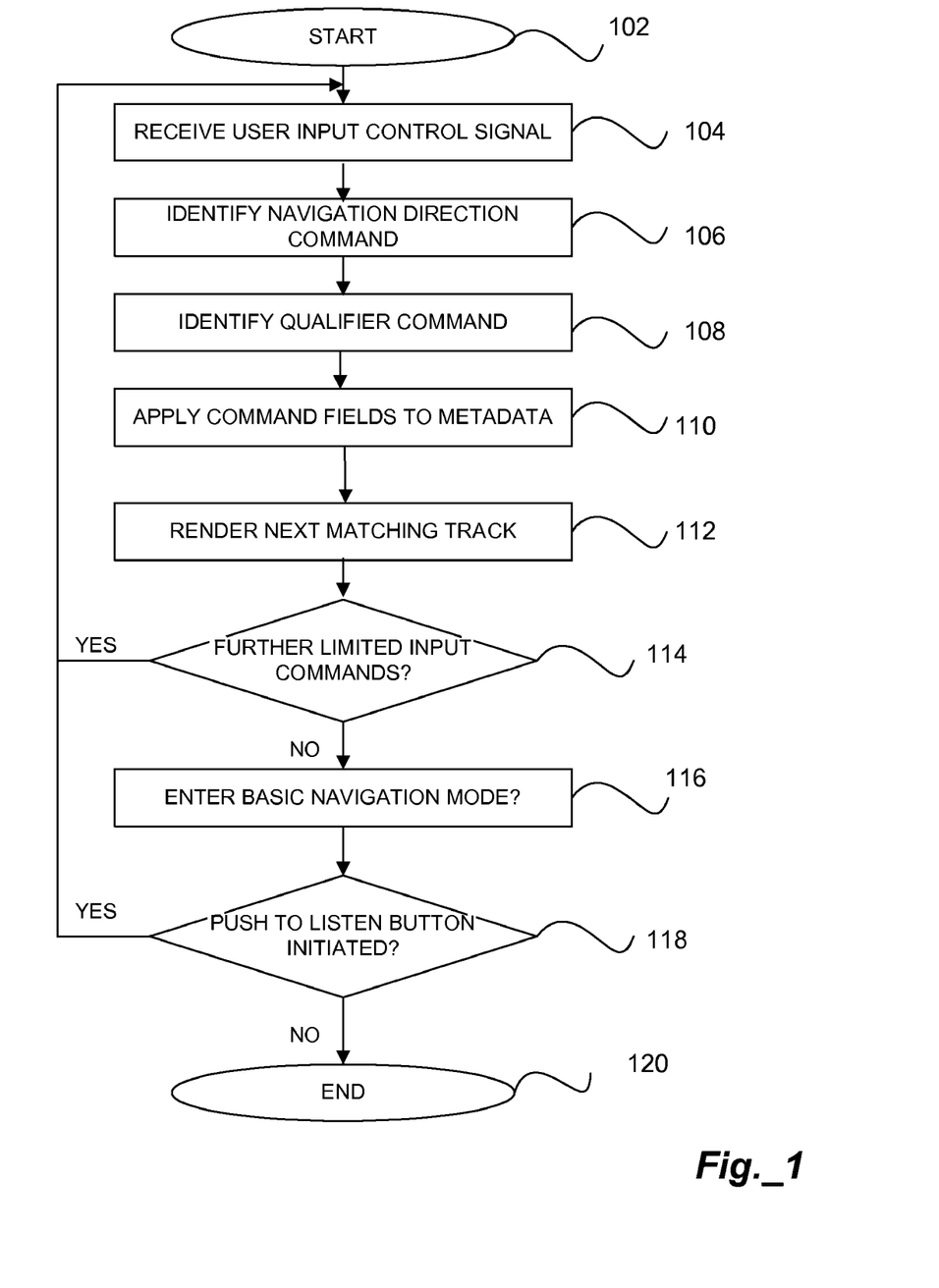
FIG. 1 is a flowchart illustrating a method of identifying tracks in accordance with embodiments of the present invention.

FIG. 1 is a flowchart illustrating a method of identifying tracks in accordance with embodiments of the present invention. The method starts at block 102. Initially, the portable player or other electronic device receives the user input control signal at block 104. Preferably, the user input control signal will include at least a navigation command and a qualifier. Next, in operation 106 the navigation command is derived from the input control signal. Next, in operation 108, the "qualifier" is derived from the control signal. The qualifier in one embodiment is a metadata type selected from well known metadata categories associated with music tracks. For example, most music consumers are familiar with metadata categories of artist, album, title track, and genre that are typically associated with music tracks. The scope of the invention, however, is not limited to music tracks nor is it limited to the above-enumerated metadata types. For example, video tracks might have other associated metadata categories, including director, producer, studio distributing the film, screenwriter, etc. The scope of the invention is intended to extend to any suitable metadata type without limitation.

The combination of these two input control signal fields are then used in operation 110 to identify a next track for rendering. Various methods of grouping metadata are known to those of skill in the relevant arts and the present invention is intended to encompass whatever technique is used to group the metadata associated with the tracks. The arrangement can be visualized as a table of metadata associated with the plurality of tracks (See FIG. 2), wherein each track can be visualized as an individual row and the associated metadata identified in corresponding columns. By using this method, the user can minimize the interaction with a display device that is presently common in hierarchical navigation on portable media players.

Next, in operation 112, the matching track is rendered. This method provides a simplified and efficient method for identifying and rendering selected tracks. In this way, one feedback as to the user's selection is provided by the actual rendering of the selected track.

The user input control can take the form of any input mechanism or combination that can provide 2 or more input field values. In one embodiment, the user input control comprises "up" and "down" scrolling buttons. In another embodiment, the user input control includes voice recognition technology integrated into a device for responding to the user's voice commands. More preferably, the voice recognition module is configured to respond to a limited number of voice commands. This has the advantage of limiting the processing power required for the portable device and limits the time required on the part of the user to train the device to recognize his vocabulary selection. In order to provide a reliable recognition of commands while limiting the processing resources devoted to the voice recognition technology, restricting the command vocabulary to a handful of words serves these dual purposes. By using a limited vocabulary or other commands (e.g., a limited number of button commands) an improved navigation experience is provided to the user.

Voice recognition technology is commercially available and known to those of skill in the relevant arts. While some voice recognition technology requires substantial hardware and memory resources, others place more modest demands on the host system. One typical area involved in tradeoffs is the size of the vocabulary that the circuit can be trained to recognize. For limited vocabulary applications, a single IC chip may be selected. For example, a suitable low cost integrated circuit chip such as the RSC-4128 IC is commercially available from Sensory, Inc. of Santa Clara, Calif. This integrated circuit includes the resources for recognizing as many as 25 or 30 speaker-trained words and a small number of speaker independent words as well.

After the selection has been made, the device is preferably placed into a waiting state, i.e., awaiting further simplified commands as illustrated in operation 114. If a further voice command is received and recognized, the process proceeds to operations 104-112 to select and render the track. In one embodiment, the device is configured with two operational modes. In a first mode, the simplified command control signal is used to select and render tracks. In a second mode, the device navigation is performed in accordance with traditional navigational hierarchy techniques. In this way, the simplified command structure is provided as an enhanced control experience.

The user may select to enter the enhanced state through any suitable selection means. For example, a 'Push to Listen' mechanism may be initiated by any suitable means, for example by pressing a button and releasing it. This wakes up the device and it listens for a key command word to identify to the device that the user is issuing commands to it. For example, a user may address the device first with a greeting command (e.g., "Zen") followed by a two-part command (e.g., "Next Album"). The portable media unit preferably stays in this state for a fixed time period (for example, 10-30 seconds), before it returns to a sleep mode. While in the responsive state, the device is preferably configured to allow the user to issue as many commands as desired. When the device returns to a sleeping state, it is preferably configured to generate a short voice message to advise the user of the impending sleeping state. This differs from most voice based designs that incorporate a 'Push to Talk' push button that requires the user to hold down the button while talking for the unit to process the voice.

In a more preferred embodiment, the portable device includes voice recognition technology integrated with other user input controls such as buttons, i.e., a basic operational mode. In this way, the portable device is fully functional even in noisy environments where the "enhanced" navigational mode from the "voice recognition technology is unavailable or unacceptable. The basic user input control buttons provided are a matter of design choice. Without intending to be limiting, one embodiment includes power, play/pause, and volume buttons. In some embodiments, the basic user input control mode is the default mode. In other embodiments, the enhanced mode described above, i.e., using a combination of simple commands, is the default mode and the basic user input buttons are used as a backup in environments wherein the "enhanced" navigation techniques are not suitable.

If no further voice commands are received in the waiting state, at the end of the allocated time period the device's voice control system is turned off. That is, the voice recognition system is no longer responsive to the user's voice commands and control is directed to the backup (basic) user input controls in operation 116. Alternatively, the voice recognition may be placed back in a responsive state by the user's manual depression of a button, such as a push to listen button described in further detail herein and illustrated in block 118.

As discussed above, the time period for the voice recognition circuitry to be responsive to further voice commands is a matter of design choice. Without intending to be limiting, for music selection and listening applications, the range of from about 10 to 30 seconds seems most suitable. The process ends at block 120.

Typically, the user will load the tracks to the current queue for his listening session. For example, a user may identify a number of different albums for playback from the overall music library stored or accessible by the portable media player. Hence, some filtering of the device's music library occurs in generating the currently playing queue for the device. The embodiments of the present invention provide a further filtering or selection mechanism for the user that can be performed in a hands free or other simplified manner to further select tracks for rendering. The techniques described above enable the user to modify the selection of the currently playing queue to conform to the user's preferences during the playback session. It should be understood that in a preferred embodiment the limited input commands are used to select tracks for rendering from a current queue of tracks selected for playback. However, the invention is not so limited. The invention extends without limitation to navigation through any grouping of tracks. For example, the user may employ the described limited control input techniques as applied to the entire music library and not just the currently playing queue. Further, the techniques may be used as a secondary and supplemental navigation technique in identifying tracks after a first navigation technique has been used to navigate a hierarchy of track metadata. For example, a playlist may be selected using a first conventional navigation technique and the limited input commands used for locating tracks within that playlist.

Figure 2:
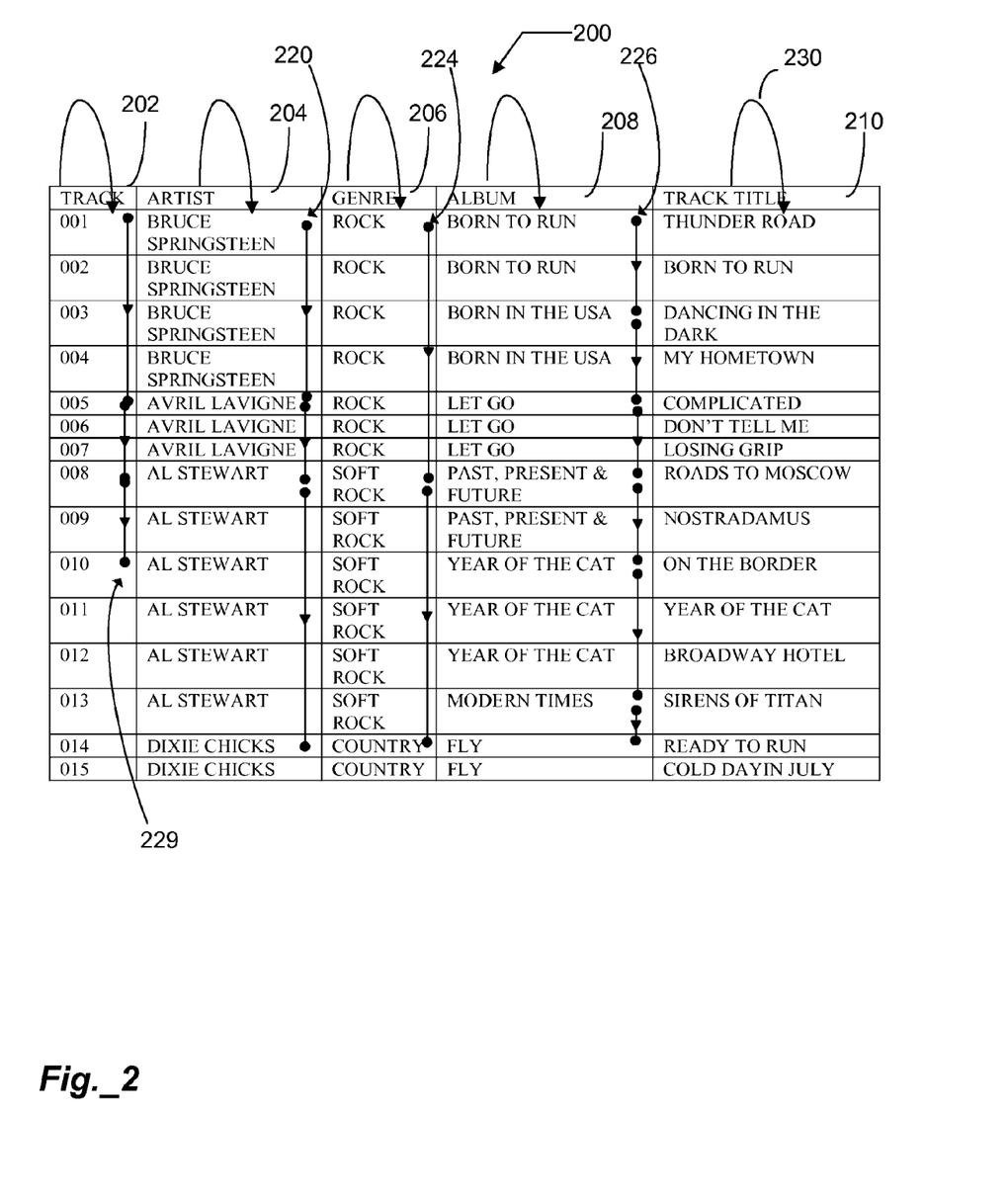
FIG. 2 is a diagram illustrating movement through an ordered listing of tracks in accordance with embodiments of the present invention.

FIG. 2 is a diagram illustrating movement through an ordered listing of tracks in accordance with embodiments of the present invention. One means for users to play tracks from the music library contained in the portable media player is to select tracks from the library for addition to a currently playing queue. This queue is also sometimes known as the current playlist. A database table 200 is shown for purposes of illustration to represent the ordered listing of tracks. The ordered listing may represent the current queue or any playlist or even the entire music library.

When a playlist is selected for rendering, the playlist becomes part of the current queue. Additional playlists, albums, or tracks may be added to the current queue. Hence, the playlist can be thought of as a subset of the current queue in these situations.

In some players, playlists may be created and stored. For example, these playlists may be generated on a host computer and transferred to the portable device. Alternatively, some portable players, for example, the Zen line of portable media players from Creative Technology LTD of Singapore, allow songs added to a currently playing playlist on the portable device to be stored as a playlist.

Each track in the current queue or playlist has associated with it metadata. Preferably, the metadata for music tracks includes categories such as at least artist name 204, album title 208, genre type 206, and track title 210. In a preferred embodiment, the tracks are grouped as the queue is created. This comports with the practice of many users to pick tracks to load into the queue. Users typically will load tracks into the queue by album, artist or genre, i.e., by groups. Picking tracks one at a time in a random manner for loading is less frequently practiced because of the time involved in selection one at a time. A preferred embodiment of the invention positions tracks in the current queue in a grouped manner because the groupings work well with the navigation technique employing limited input control signals. Alternatively, if the tracks are loaded into the queue in a random manner, in one embodiment, the media player is configured to group the tracks for playback according to at least one metadata field for the tracks. For example, the player may be configured to rearrange the queue such that the tracks are grouped in the ordering according to artist, album, or genre or any combination of the foregoing.

In the queue represented by table 200, the use of the limited input controls of the present embodiments allows the user to traverse the playlist without feedback save for the commencement of playback of the next matched track. In most players, the queue such as queue 200 illustrated in FIG. 2 can be navigated by depressing the forward or reverse buttons, allowing incremental track movement through the queue, one track at a time. In the present embodiment, the limited input selection mechanism causes the focus to move to the next track having the selected metadata field (the "qualifier" in the command) and to stay with that track. For example, when the qualifier is "album" and the navigation operation is "Next", this navigation technique will cause the playback to move to the next album and to play the tracks associated with that album before moving on to other tracks (i.e., tracks not part of the album).

Several example navigation progressions using the navigation operation "Next" are illustrated in FIG. 2. For example, if the user selects artist as the second part of the command (i.e., the qualifier), then the navigation path 220 will result. That is, from an initial location at track 1 (performed by artist Bruce Springsteen), the user may jump to track 005, a track performed by artist Avril Lavigne through the use of the command "Next" "Artist". As noted, preferably these user control commands will be generated by the user's voice commands and recognized by the voice recognition module of the device. According to alternative embodiments, the control commands may be generated by buttons, touch screens, scroll buttons, soft buttons, etc. or any combination. Repeating this command will result in movement to track 008, performed by artist Al Stewart. Finally, repeating this command again will result in movement to track 014 performed by artist the Dixie Chicks.

Alternatively, the navigation or progression through the ordered listing may be accomplished using the qualifier "genre" or "album". Path 224 illustrates movement through the queue 200 using the qualifier "genre". Path 226 illustrates movement through the queue 200 using the qualifier "album". In one embodiment, the user navigates through the queue using a sequence of different qualifiers. For example, the user may progress from track 001 to track 010 by generating a first command sequence "Next Artist", repeating the commands "Next Artist", followed by the command sequence "Next Album". The overview of this series of commands is shown by path 229.

Figure 3:
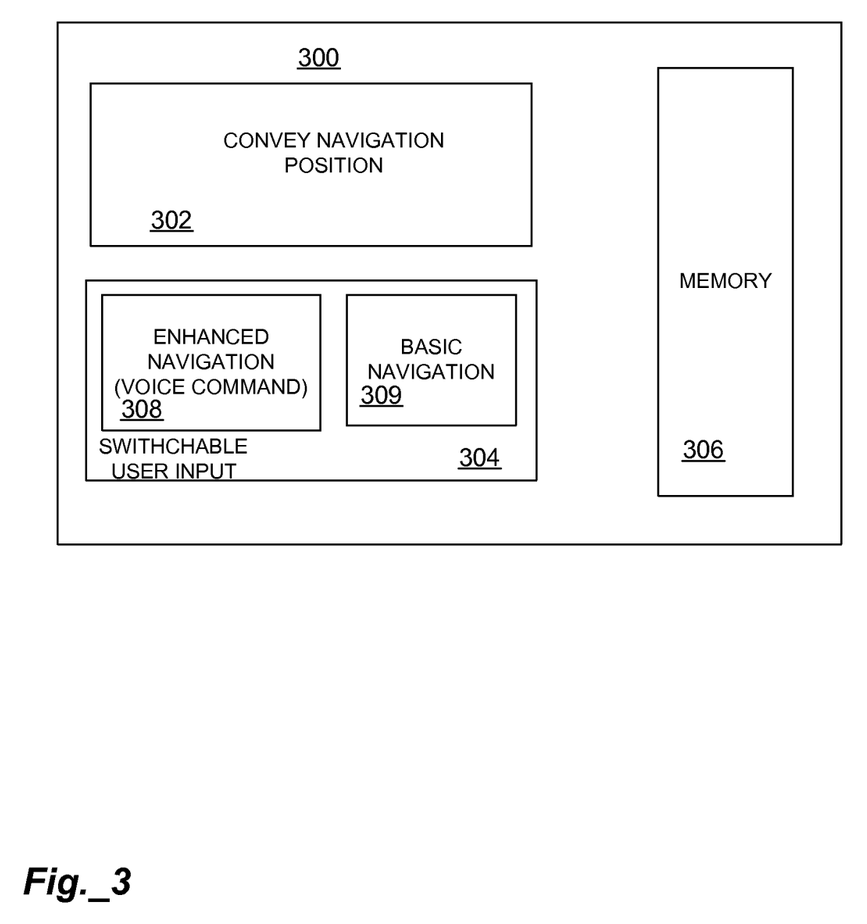
FIG. 3 is a diagram illustrating a device having a user interface in accordance with embodiments of the present invention.

FIG. 3 is a diagram illustrating a device 300 having a user interface in accordance with embodiments of the present invention. The user interface includes a presentation module 302 to present the navigation position of the user and a switchable user input module 304. Preferably the user input module is configured to enable switching of the user input, i.e., from a basic navigation module 309 to an enhanced navigation module 308, and vice versa. In one embodiment, the tracks are categorized according to a hierarchy of metadata associated with each track. For example, in reference to music tracks, the metadata fields associated with each track include track title, artists, albums, genre type as well as other classification schemes. Typically the track title will have a one to one correspondence with the tracks and in the hierarchical scheme is viewed as a leaf. In contrast, the categories artists, albums, genres correspond to higher levels in the hierarchy. That is, they reflect nodes, each node having at least one level of the hierarchy beneath it. In this way, navigating using a qualifier command that corresponds to one of these nodes allows navigation to proceed faster than on a track by track basis that is common in portable media players.

In the basic navigation scheme that has been disclosed in the art, navigation proceeds through the hierarchy with a user selection of a category from input buttons or other user input controls on the device and in response, the presentation module 302 displays a listing of items within that category is made on the display screen. Typically the user makes another selection, for example by highlighting one of the items and allowing the screen to convert to an expansion of the selected item, i.e., a second presentation of a listing or plurality of items. In this way, the user can access tracks stored in the memory 306 of the portable media player. The basic navigation is preferably available as a backup to the enhanced navigation mode. The memory storage functions to store data sequences, preferably in the form of compressed or uncompressed audio or video files. A rendering module functions to allow playback of the music, audio or video files. For example, when a compressed .mp3 audio file is selected for playback, the rendering module decompresses and plays back the selected data sequence.

The switchable user input 304 may be switched to the enhanced mode by any switching mechanism. For example, a push to listen input control (e.g., a switch) may be initiated to enter the enhanced navigation as described hereinbefore. It should be understand that using voice recognition technology to identify limited user input commands overcomes many of the difficulties presented wherein consumer devices are intended for use with a large vocabulary of descriptive terms from a plurality of users. For example, considerable training time is required where the intent is to enable the device to respond to voice commands identifying single tracks by speaking the metadata values applicable to that track. For example, a device holding 1000 tracks would require a vocabulary of at least several thousand terms to cover the track titles and artists. While these techniques work in ideal cases where a quiet environment, a fast computer, a sensitive microphone, and a patient user with the time to "train" the system, they are not presently feasible for the hardware and various environments faced by a portable media player. Presenting voice commands in the limited command navigation as described in embodiments of the present invention overcomes these problems.

In the basic navigation method, the data sequences in the database are accessed preferably according to a hierarchical model. In the hierarchical model, navigation to the track will involve movement from a parent node level (a higher level) to a child level (i.e., a lower level) and perhaps finally to a grandchild level, e.g., a "leaf" in a navigational hierarchy tree. Within each level navigation can involve movements generally characterized as next or previous to scroll a listing In some hierarchical models, the parent may have many children but one child can have only one parent. In the musical track hierarchy example, the track includes metadata that identifies attributes of the track, for example including artist names, track titles, album titles, and genre type for the track. Every item within a category is more specific (i.e., less abstract) than the category itself. Preferably, for the hierarchical navigation, the metadata category names are intuitive. In some embodiments of the present invention, a track (i.e., an end item or leaf) is preferably associated with more than one parent. That is, an overlapping hierarchy is accessed. For example, a track can be accessed by genre then artist, then album, then track or by alternative means, for example, directly by artist then track.

Figure 4:
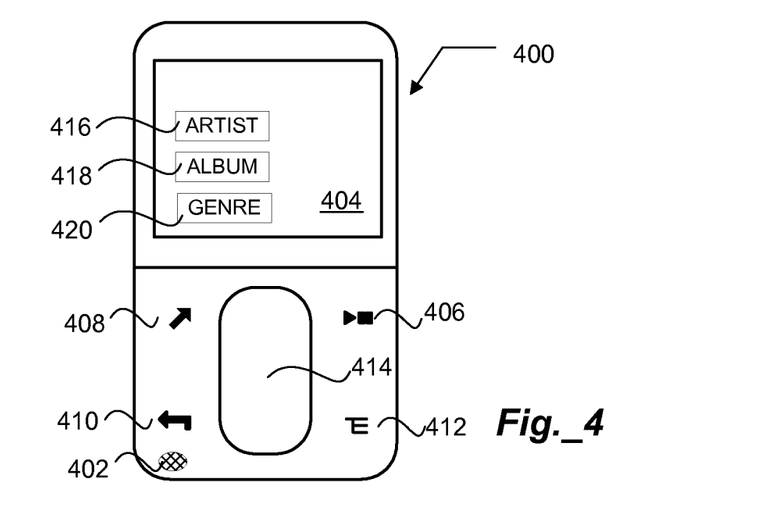
FIG. 4 is a diagram illustrating a portable media device configured to provide user control in accordance with embodiments of the present invention.

FIG. 4 is a diagram illustrating a potable media device 400 configured to provide user control in accordance with embodiments of the present invention. The device 400 is configured with a microphone 402 to receive voice commands in the enhanced mode described above. The device also includes a display screen 404 for presentation of navigation information, especially during the basic mode navigation. The device is also preferably configured with various basic input controls, 406, 408, 410, 412, and 414 to assist the user with basic operation mode. The display screen 404 may also be configured to provide touch sensitive controls. For example, portions 416, 418, and 420 may be designated as touch sensitive areas for limited input commands such as respectively artist, album, and genre. Thus, for example, a two part command such as "Next Artist" may be selected in the enhanced mode by depressing push button 406 (to designate 'next') and portion 416 of the display screen 404. Alternatively, of course, voice control may be effectuated for the enhanced mode by using microphone 402, with or without some feedback provided on the display screen 404.

Figure 5:
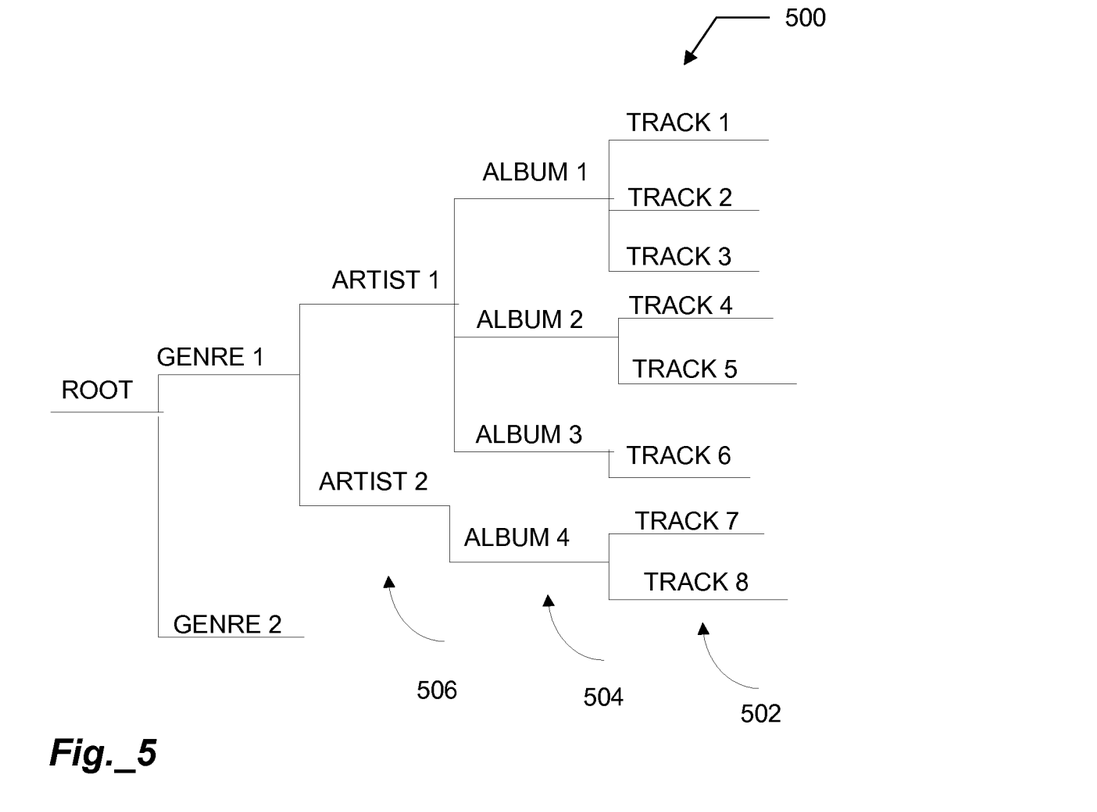
FIG. 5 is a diagram illustrating a sample hierarchy for use in navigation in accordance with one embodiment of the present invention.

FIG. 5 is a diagram illustrating a sample hierarchy for use in navigation in accordance with one embodiment of the present invention. The diagram 500 represents a hierarchy of metadata applicable to tracks. In this embodiment, the hierarchy is used in the basic navigation mode with the input buttons and the display screen as illustrated in FIG. 4. In the enhanced mode, the voice command inputs designate a "qualifier" command that identifies preferably one of the node levels above the leaf or end item tracks. In this way, navigation is made simpler and doesn't require reliance on the display screen for feedback as to the present location in the navigation hierarchy. That is, node levels 504 or 506 or higher are preferably specified as the qualifier. It should be understand that the use of the hierarchy model has been for illustration purposes and is not intended to be limiting. Another way of viewing the enhanced navigation process is a filtering process, wherein the qualifier is a selected metadata filed, preferably having in the database a relationship with more than one end item or leaf. For example, a track title enjoys a one to one relationship with the track and thus would be less preferred as a way of navigating in this mode as compared to a higher level such as artist, where several tracks (end items) are associated with the selected category, hence allowing larger navigation movements through the ordered listing.

Figure 6A:
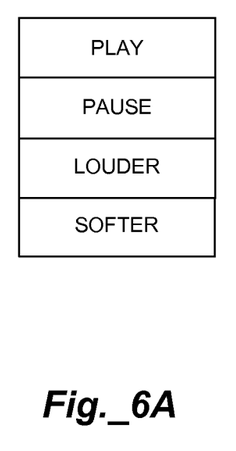
FIG. 6 is a diagram illustrating a sampling of enhanced mode commands in accordance with embodiments of the present invention.

FIG. 6 is a diagram illustrating a sampling of enhanced mode commands in accordance with embodiments of the present invention. Even with devices where the preferred mode is the enhanced mode, it is preferred that the device also be equipped with standard buttons for control options. For example, FIG. 6A illustrates commands that duplicate buttons on the unit. These include Play (starts the unit playing from the first or paused point in the track list); Pause (pauses the playback on the unit); Louder (increases the volume level); and Softer (decreases the volume level).

In one embodiment, all spoken commands begin with a fixed target tag word, for example, such as "MuVo" would signal the voice recognition using to begin listening for a command . . . as in "MuVo, Pause" to pause the playback. An additional Mute Command (mutes the audio volume) in a preferred embodiment is only available from the voice interface.

In a preferred embodiment, the direction command (i.e., the navigation command) is one of "next" or "previous" and the "qualifier" field is one of genre, artist, or album. In accordance with another embodiment, the direction and qualifier (base field) commands are provided by the user's voice and the device is recognized by the device's voice recognition unit. Example command sequences follow:

TABLE 1

| Commands that have multiple options following them: | |
|---|---|
| Next [blank] | Skip to the next track (all movements assume a circular content list) |
| Next Album | Skip to the next album in the content list |
| Next Artist | Skip to the next artist in the content list |
| Previous [blank] | Skip to the previous track |
| Previous Album | Skip to the previous album in the content list |
| Previous Artist | Skip to the previous artist in the content list |
| Repeat [blank] | Replay all tracks in list |
| Repeat Album | Replay current album in the content list |
| Repeat Artist | Replay current artist in the content list |
| Repeat Track | Replay current track |
| Shuffle [blank] | Randomly pick the next track from all tracks in the content list |
| Shuffle All | Randomly pick the next track from all tracks in the content list |
| Shuffle Avant-Garde | Randomly pick the next track from all avant-garde genre tracks in the content list |
| Shuffle Classical | Randomly pick the next track from all classical genre tracks in the content list |
| Shuffle Comedy | Randomly pick the next track from all comedy genre tracks in the content list |
| Shuffle Country | Randomly pick the next track from all country genre tracks in the content list |
| Shuffle Easy Listening | Randomly pick the next track from all easy listening genre tracks in the content list |
| Shuffle Electronica | Randomly pick the next track from all electronica genre tracks in the content list |
| Shuffle Folk | Randomly pick the next track from all folk genre tracks in the content list |
| Shuffle Gospel | Randomly pick the next track from all gospel genre tracks in the content list |
| Shuffle Hip Hop | Randomly pick the next track from all hip hop genre tracks in the content list |
| Shuffle Jazz | Randomly pick the next track from all jazz genre tracks in the content list |
| Shuffle Latin | Randomly pick the next track from all latin genre tracks in the content list |
| Shuffle New Age | Randomly pick the next track from all new age genre tracks in the content list |
| Shuffle R&B | Randomly pick the next track from all r&b genre tracks in the content list |
| Shuffle Reggae | Randomly pick the next track from all reggae genre tracks in the content list |

TABLE 1-continued

| Commands that have multiple options following them: | |
| --- | --- |
| Shuffle Rock | Randomly pick the next track from all rock genre tracks in the content list |
| Shuffle Soundtrack | Randomly pick the next track from all soundtrack genre tracks in the content list |
| Shuffle Spoken Word | Randomly pick the next track from all spoken word genre tracks in the content list |
| Shuffle Vocal | Randomly pick the next track from all vocal genre tracks in the content list |
| Shuffle World | Randomly pick the next track from all world genre tracks in the content list |

Figure 6B:
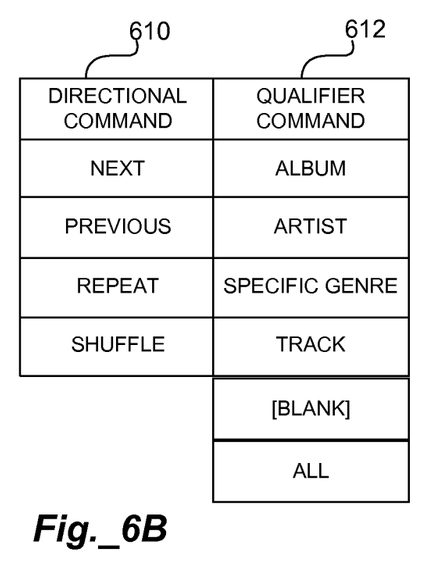

As shown, where the navigation operation part of the command signal is either "next" or previous", tracks having the same value in the metadata category, such as in "album" or "artist" categories, are skipped in the selection process and the player proceeds until it fields a track having a new (i.e., an unmatching) value in the selected metadata category defined by the second part of the command. Where the navigation operation part of the command signal is 'repeat' or "shuffle", a different comparison process takes place for the selected metadata category. That is, the method proceeds to find a track having a match in the qualifier filed. For example, where the command is "Repeat Album", the current album in the content list is replayed, and the next or second track played after the current (first) track will have matching values for the selected metadata category. Hence, any track that doesn't match the value of the current track in the "album" metadata category will be skipped. Likewise, a "Shuffle Genre" command will skip any track that doesn't match the value of the first track in the genre metadata field. In a more preferred embodiment, the second part of the command will include as a category a specific genre as illustrated in FIG. 6B. For example, a command that includes a specific genre type such as "Shuffle Jazz" will result in the random selection of the next track from all "jazz" genre tracks in the content list. In accordance with this command, the device will skip any tack that doesn't match the specific genre, i.e., that doesn't have the "jazz" value in the genre metadata category field.

The foregoing description describes several embodiments of navigation techniques for selecting tracks for rendering. While the embodiments describe details of methods for generating navigation commands using speech, the invention is not so limited. The scope of the invention is intended to extend to all forms of user input control commands configured to effectuate navigation using the described techniques. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method of navigating from a first track to a second track in an ordered listing of tracks having at least one metadata category associated with each of the tracks, the method executable on a device and comprising:

receiving a command signal that identifies a navigation operation and a metadata qualifier, wherein the tracks are either video tracks or audio tracks and the metadata qualifier in the command signal corresponds to either artist, album, genre, track title, director, producer, studio distributing the film, or screenwriter;

selecting from the ordered listing a second track based on 1) a comparison of a first value for a metadata category derived from the metadata qualifier with the second track's value for the metadata category and 2) the navigation operation identified in the command signal, wherein the first value for the metadata category is determined by examining the first track's metadata category corresponding to the metadata qualifier; and navigating from the first track in the ordered listing to the second track in the ordered listing based on the selection.

2. The method as recited in claim 1 wherein the first value for the metadata category is a specific genre type identified in the command signal's metadata qualifier and the comparison comprises matching the specific genre type with the second track's value for the metadata category.

3. The method as recited in claim 2 wherein the navigation operation is one of shuffle and repeat.

4. The method as recited in claim 1 wherein the comparison comprises a determination that the second track's value for the metadata category does not match the first value and the navigation operation is one of next, previous, and shuffle.

5. The method as recited in claim 1 further comprising navigating to a third track after selecting the second track by:

receiving a second command signal that identifies a second navigation operation and a second metadata qualifier; and selecting from the ordered listing a third track based on 1) a comparison of a third value for a metadata category derived from the metadata qualifier with the third track's value for the metadata category and 2) the second navigation operation identified in the second command signal.

6. The method as recited in claim 1 wherein the ordered listing is arranged in the order that tracks are placed in the listing by a user.

7. The method as recited in claim 1 wherein the metadata qualifier identifies a grouping of tracks.

8. The method as recited in claim 1 wherein the command signal is generated using a voice input.

9. The method as recited in claim 1 wherein the command signal is generated using at least in part at least one of a touch screen on the device, a switch, and a sensor responsive to a gesture of the user.

10. The method as recited in claim 1 wherein the ordered listing is a currently playing queue.

11. The method as recited in claim 1, wherein the second track is rendered in response to the navigation from the first track to the second track.

12. A method of navigating to a track within a plurality of tracks, the method executable on a device and comprising:

associating a plurality of tracks with a queue accessible for immediate playback of the tracks associated with the queue;

identifying a first track in the queue;

receiving a voice command to move from a first track to a second track in the queue, wherein the command includes a navigation operation aspect and a metadata qualifier aspect, and wherein the plurality of tracks are either video tracks or audio tracks and the metadata qualifier aspect in the command signal corresponds to either artist, album, genre, track title, director, producer, studio distributing the film, or screenwriter;

selecting the second track as based on the navigation operation aspect of the command and an evaluation of the metadata qualifier aspect, wherein the evaluation comprises determining a metadata category corresponding to the metadata qualifier aspect and a comparison of the first track's value for the metadata category with the second track's value for the metadata category; and navigating from the first track in the queue to the second track in the queue based on the selection.

13. The method as recited in claim 12 wherein the navigation operation comprises one of next and previous, wherein next refers to a next track in the ordered arrangement of tracks, previous refers to a previous track in the ordered arrangement of tracks, and wherein the comparison comprises a determination that the first value does not match the second value.

14. The method as recited in claim 12 wherein the navigation operation comprises a repeat command referring to a grouping having at least one track currently accessed and wherein the comparison comprises a determination that the first value matches the second value.

15. The method as recited in claim 12 wherein the navigation operation comprises a shuffle command for playing selected tracks in the queue in a randomized order, the metadata qualifier identifies a specific genre type and the comparison comprises a determination that the first value matches the second value.

16. The method as recited in claim 12 further comprising, before the voice command is received, receiving an initiation signal for placing a device in a ready state for receiving the voice command.

17. The method as recited in claim 12 wherein the voice command further includes a greeting command advising of an impending navigation operation aspect or metadata qualifier aspect of the command signal.

18. A device for rendering of tracks in an ordered listing, the device comprising:

memory for storage of tracks;

a voice recognition module; and a user interface having a selection mechanism and a presentation mechanism, wherein the selection mechanism is operable in at least two modes, a first mode wherein the navigation position in a navigational hierarchy of the ordered listing is displayed to the user on the presentation mechanism and a second mode wherein the next track is identified for playback by a processor configured to:

identify a first track in the ordered listing;

receive from the voice recognition module a command signal that identifies a navigation operation and a metadata qualifier, wherein the tracks are either video tracks or audio tracks and the metadata qualifier in the command signal corresponds to either artist, album, genre, title track, director, producer, studio distributing the film, or screenwriter;

select from the ordered listing a second track based on 1) a comparison of a first value for a metadata category derived from the metadata qualifier with the second track's value for the metadata category and 2) the navigation operation identified in the command signal, wherein the first value for the metadata category is determined by examining the first track's metadata category corresponding to the metadata qualifier; and navigate from the first track in the ordered listing to the second track in the ordered listing based on the selection.

19. The device as recited in claim 18 wherein the user interface is further configured to respond to a control signal to activate the device from a sleep state for reception of a voice command and to reenter a sleep state after a predetermined period elapses without detection of a voice command.

* * * * *